United States Patent Office 3,156,998
Patented Nov. 17, 1964

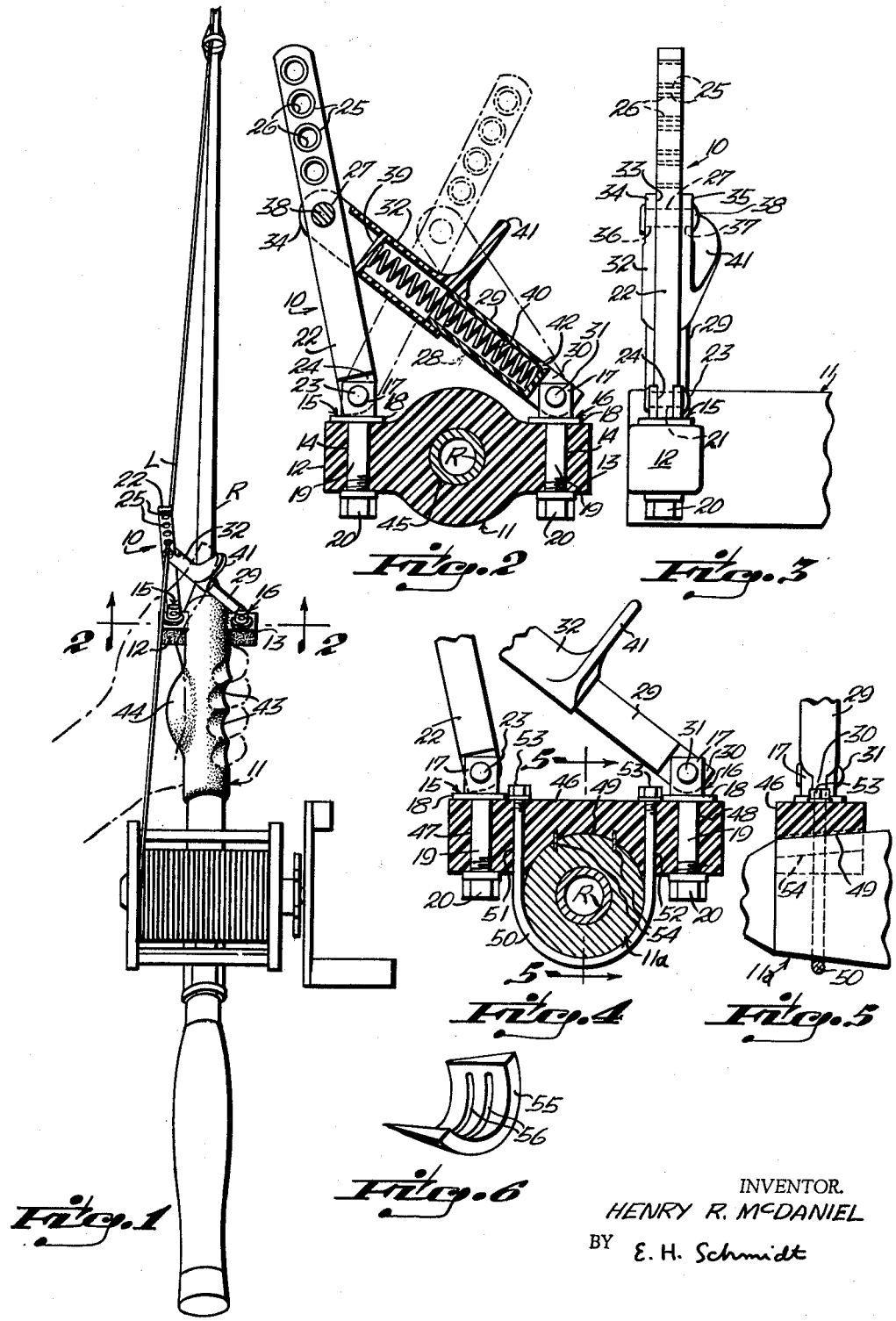
Nov. 17, 1964    H. R. McDANIEL    3,156,998
MANUALLY OPERATED LEVEL WIND FOR A FISHING REEL
Filed April 12, 1963
INVENTOR.
HENRY R. McDANIEL
BY E. H. Schmidt

3,156,998
MANUALLY OPERATED LEVEL WIND FOR A FISHING REEL
Henry R. McDaniel, 3358 SW. 2nd St., Miami, Fla.
Filed Apr. 12, 1963, Ser. No. 272,713
8 Claims. (Cl. 43—24)

My invention relates to sport fishing and is directed particularly to an improved line leveler or guide for fishing reels.

When fishing with heavy fishing gear designed for heavy game fish or deep sea fishing, the tension on the line and the size of the reel are such as to present difficulties in guiding the line back and forth as it is reeled in so as to be substantially level along the width of the reel. Line guides of various types have heretofore been devised, but in general, have been found unsuitable for one or more reasons, principally because they depend upon an unnatural actuating movement of the thumb.

It is accordingly the principal object of my invention to provide an improved line leveler or line guide particularly suitable for the heavier types of fishing gear in which the line guiding mechanism is actuated by successive natural inward movements of the thumb of the hand while grasping the foregrip of a fishing rod, much like a squeezing action of the hand, the return strokes being effected without effort by a compression spring.

It is another object to provide a line leveler device of the above nature wherein the associated foregrip is so formed as to support the hand in substantially fixed position with respect to the actuating mechanism to minimize any possibility of slippage, axial or rotary, of the rod in the hand while playing and reeling in a fish.

Yet another object of the invention is to provide a line leveler device of the character described which can be combined as a unit with a fishing rod foregrip for use in the manufacture of fishing rods, or supplied separately of a foregrip and having means for attachment to a foregrip on a rod as an accessory.

Yet another object is to provide a line leveler which will be easy to use, inexpensive to manufacture, and durable and efficient in operation.

Other objects, features and advantages of the invention will be apparent from the following description when read with reference to the accompanying drawings.

In the drawings, wherein like reference numerals denote corresponding parts throughout the several views;

FIG. 1 is a top view of the handle end of a fishing rod showing a line leveler embodying the invention assembled thereto;

FIG. 2 is a transverse cross-sectional view taken along the line 2—2 of FIG. 1 in the direction of the arrows and showing constructional details of the actuating mechanism;

FIG. 3 is a side elevational view of the line leveler device shown separately and with a portion of its integral foregrip broken away;

FIG. 4 is a transverse cross-sectional view illustrating a modification of the invention without the integral foregrip, for use as an accessory device;

FIG. 5 is a vertical cross-sectional view taken along the line 5—5 of FIG. 4 in the direction of the arrows; and FIG. 6 illustrates in oblique view a shim for use in attaching the accessory line leveler of FIGS. 4 and 5 to the foregrip of a fishing rod.

Referring now in detail to the drawings, 10 in FIGS. 1, 2 and 3 designates a line guide device embodying the invention, the same being shown assembled upon a fishing rod R. The line guide device 10 comprises a foregrip portion 11, preferably molded of a synthetic plastic material and having an axial opening for assembly to a fishing rod, said foregrip portion being integrally formed with a pair of diametrically opposed support wings 12, 13 of substantially rectangular cross-section. The support wings 12, 13 are formed with spaced, parallel, through openings 14, 14. Support posts 15 and 16 are secured to the wings 12 and 13, respectively, said support posts each preferably being made of a non-corroding metal and having head portions 17, flange portions 18, threaded stud portions 19 received within respective wing openings 14, and retainer nuts 20, preferably of a synthetic plastic so as to be self-locking, received on said stud portions and serving to clamp said support posts in place. The head portions 17 of the support posts 15 and 16 are formed with transverse slots 21, in alignment with one another, as best illustrated in FIGS. 2 and 3. The slot 21 of support post 15 has swingably mounted thereon one end of an elongated guide lever 22 by means of a pivot pin 23 extending through openings in the head portion 17 and a flattened end portion 24 of said guide lever. The other end of the guide lever 22 is provided with a plurality of spaced openings 25 within which are secured hard metal eyelets 26 for carrying a fish line. The eyelets 26 are preferably of a very hard material such as carballoy to resist abrasion or wearing away, even by action of a heavy wire fish line running therethrough. The guide lever 22 is also provided with a through opening 27 spaced inwardly of the innermost eyelet 26 for the pivoting of an actuating mechanism indicated generally at 28 in FIG. 2.

The actuating mechanism 28 comprises a tubular metal lower link member 29, integrally formed with a flat pivot portion 30 at one end which is received within the head slot 21 of the support post 16 and swingably supported thereat as by pivot pin 31. Telescopingly received over the outer end of the lower member 29 is an upper link member 32, generally tubular in form and having an outer end slot 33 defining opposed side wall portions 34 and 35. The side wall portions 34 and 35 are provided with a pair of opposed openings 36, 37. As best illustrated in FIG. 2, the guide lever 22 is received within the slot 33 of the upper link member 32 and pivotally linked to said upper link member by a pivot pin 38 extending through the openings 36, 37 of said upper link member, and the opening 27 in said guide lever. The upper link member is provided, near its outer end, with a transverse interior wall portion 39. A compression spring 40 is disposed within the tubular portions of the actuator 28, having one end constrained against the inner end of the lower link member 29 thereof, and the other end constrained against the wall portion 39 of the upper link member 32, said spring serving to normally urge said actuator to its extended position wherein the guide lever is at rest at its greatest distance to the left, as seen by the full line representation thereof in FIG. 2. The inner end of the upper link member 32 is integrally formed with a laterally-extending thumb piece 41 directed outwardly of the guide lever 22 and adapted to receive the thumb of the left hand when grasping the foregrip portion 11, as indicated by the broken line representation thereof in FIG. 1.

In use it is only necessary to regularly push down upon the thumb piece 41 while reeling in a line L to move the guide lever 22 clockwise to its limit position, as illustrated by the broken-line representation of said guide lever in FIG. 2. This can be done quite naturally against the reactive force of the compression spring 40 by a simple inward pressing motion of the thumb. Upon reaching the terminal position of the guide lever 22, the thumb will be relaxed to allow the spring 40 to return the guide lever. Alternate pushing and relaxation of the thumb will allow the guide lever 22 to move from one side to the other, for leveling a line L carried and guided by an appropriate eyelet 26 as the line is reeled in.

As illustrated in FIG. 1, the foregrip portion 11 of the line leveler device 10 is formed at one side with four finger recesses 43 and at the other side with a rounded protrusion 44 acting as an abutment for the heel of the hand, as illustrated in FIG. 1, so as to permit a firm grip with the thumb in proper position for actuation of the line guiding and leveling mechanism as above described with minimum possibility of rotary slippage or axial sliding in the hand even under conditions of hard usage.

In order to drain any water that might find its way into interior of the lower link member 29, drainage opening 42 is drilled near the lower end thereof, as illustrated in FIG. 2.

FIGS. 4, 5 and 6 illustrate a modification of the invention for use as an accessory line leveling device for attachment to fishing rods, the same differing only in that the support post 15, 16 are assembled to a yoke member 46, being attached in through openings 47 and 48 thereof as best seen in FIG. 4. The underside of the yoke member 46 is formed with a tapered, semi-circular recess 49 adapted to seat upon the foregrip 11a of a fishing rod R. Means for attachment to the rod comprises a U-shaped clamp member 50, the opposed threaded arms of which extend up through a pair of spaced openings 51, 52 in the yoke member 46. A pair of synthetic plastic self-locking nuts 53, 53 serve to tightly clamp the yoke member 46 to the foregrip 11a. To insure against slippage of the yoke member 46 with respect to the foregrip 11a, a pair of thin metal strips 54 are molded within the wall of the recess 49, projecting slightly outwardly therefrom to become imbedded in and thus lock with the foregrip 11a when the clamp member 50 is drawn up tight. If the taper of the recess 49 of the yoke member 46 does not correspond to that of the foregrip to which it is to be attached, an arcuate wedge 55 (see FIG. 6) can be used as a shim. The wedge 55 is preferably molded of a slightly elastic material, and formed with interior grooves or recesses 56 to provide vacuum cup gripping action. The use of the embodiment illustrated in FIGS. 4, 5 and 6 is otherwise the same as described above with reference to the first embodiment shown in FIGS. 1, 2 and 3.

While I have illustrated and described herein only two forms in which the invention may conveniently be embodied in practice, it is to be understood that these forms are presented by way of example and not in a limiting sense. The invention, in brief, comprises all the embodiments and modifications coming within the scope and spirit of the following claims.

What I claim as new and desire to secure by Letters Patent is:

1. In a line leveler for fishing reels, the combination comprising, a support member for attachment to a fishing rod, an elongated guide lever, a first means pivotally supporting one end of said guide member with respect to said support member for relative swinging motion, a plurality of through openings spaced along the other end of said guide lever, an elongated link member, said link member comprising tubular upper and lower members fitted together and relatively movable in telescoping fashion, a compression spring within said tubular members and acting against opposed inner end portions thereof to normally hold said tubular members in relatively separated relation, said upper tubular member being of greater size than said lower tubular member for the reception of said lower tubular member in telescoping fashion, said upper tubular member being pivotally attached at its outer end to an intermediate portion of said guide lever, a second means pivotally supporting said lower tubular member at its outer end relative to said support member at a position spaced from said first pivotal support means, said upper tubular member being formed with a laterally-extending thumb piece facilitating manual telescoping of said tubular members against the reactive force of said compression spring for swinging said guide member from side to side.

2. A line leveler for fishing reels as defined in claim 1, wherein said support member is in the form of an elongated foregrip having an axial opening for receiving a fishing rod, said first and second pivotal support means comprising a pair of opposed wing members integrally formed with and extending laterally of one end of said foregrip.

3. A line leveler for fishing reels as defined in claim 2, including a hard metal eyelet fixed in each of said plurality of through openings.

4. A line leveler for fishing reels as defined in claim 2, wherein said foregrip is formed at one side with a plurality of finger recesses, and at the opposite side with a rounded protrusion for abutment with the heel of the hand when gripping said foregrip, whereby the possibility of rotary or axial slippage thereof in the hand is minimized.

5. A line leveler for fishing reels as defined in claim 1, wherein said support member comprises a yoke member, and means on said yoke member for attachment thereof to the foregrip of a fishing rod.

6. A line leveler as defined in claim 5 wherein said attachment means comprises a semi-circular recess formed at one side of said yoke member and a U-shaped clamp member adjustably secured to said yoke member and so arranged as to embrace and clamp a foregrip in said recess.

7. A line leveler as defined in claim 6, including a plurality of lock members protruding outwardly of the wall of said recess and operative to engage within a foregrip clamped to said yoke member to minimize the possibility of relative motion between said yoke member and said foregrip.

8. A line leveler as defined in claim 7, including an arcuate wedge serving as a shim between the peripheral wall of said foregrip and the recess of said yoke member.

References Cited in the file of this patent
UNITED STATES PATENTS

| | | |
|---|---|---|
| 1,043,397 | Capell | Nov. 5, 1912 |
| 2,305,045 | Torrence | Dec. 15, 1942 |
| 2,514,929 | Brandt | July 11, 1950 |